US006930590B2

(12) United States Patent
Ling et al.

(10) Patent No.: US 6,930,590 B2
(45) Date of Patent: Aug. 16, 2005

(54) MODULAR ELECTROTACTILE SYSTEM AND METHOD

(75) Inventors: Sho-Hung Welkin Ling, Langley (CA); Chi-Chia Chang, Taipei (TW); Wanchih Lin, Taipei (TW)

(73) Assignee: Ownway Biotronics, Inc., Hsinchu (TW)

( * ) Notice: Subject to any disclaimer, the term of this patent is extended or adjusted under 35 U.S.C. 154(b) by 93 days.

(21) Appl. No.: 10/166,828

(22) Filed: Jun. 10, 2002

(65) Prior Publication Data

US 2003/0227374 A1 Dec. 11, 2003

(51) Int. Cl.$^7$ ................................................. H04B 3/36
(52) U.S. Cl. ..................... 340/407.1; 340/7.6; 434/113; 434/114; 341/27; 414/5; 310/319
(58) Field of Search ........................ 340/407.1, 407.2, 340/7.6; 434/113, 114; 341/27; 414/5

(56) References Cited

U.S. PATENT DOCUMENTS

| | | | | |
|---|---|---|---|---|
| 3,562,408 | A | * 2/1971 | Collins et al. ................. | 348/62 |
| 4,390,756 | A | 6/1983 | Hoffmann et al. .......... | 179/107 |
| 4,555,953 | A | * 12/1985 | Dario et al. ........... | 73/862.046 |
| 4,655,673 | A | 4/1987 | Hawkes ....................... | 414/730 |
| 4,926,879 | A | 5/1990 | Sevrain et al. .............. | 128/798 |
| 4,979,508 | A | * 12/1990 | Beck ............................ | 607/54 |
| 5,583,478 | A | * 12/1996 | Renzi ....................... | 340/407.1 |
| 5,619,180 | A | 4/1997 | Massimino et al. ...... | 340/407.1 |
| 5,631,861 | A | * 5/1997 | Kramer ......................... | 703/7 |
| 5,922,012 | A | * 7/1999 | Sakano ........................ | 607/46 |
| 5,957,812 | A | 9/1999 | Harrigan ........................ | 482/8 |
| 6,059,506 | A | * 5/2000 | Kramer ........................... | 414/5 |
| 6,326,901 | B1 | * 12/2001 | Gonzales ..................... | 340/7.2 |
| 6,430,450 | B1 | * 8/2002 | Bach-y-Rita et al. ....... | 607/134 |
| 6,809,462 | B2 | * 10/2004 | Pelrine et al. .............. | 310/319 |

OTHER PUBLICATIONS

Takaai Nara, et al., The University of Tokyo, Surface Acoustic Wave (SAW) Tactile Display Based on Properties of Mechanoreceptors.

Robert J. Stone, Haptic Feedback: A Potted History, From Telepresence to Virtual Reality.

(Continued)

Primary Examiner—Benjamin C. Lee
(74) Attorney, Agent, or Firm—Troxell Law Office, PLLC (57) ABSTRACT

This application relates to an electrotactile system and method for delivering tactile stimuli to a skin surface of a user. The system includes one or more electrotactile modules each comprising an array of electrodes electrically connected to an integrated circuit. Each integrated circuit has data processing and current driving capability. The current delivered from the integrated circuit to each electrode is relatively small, preferably less than 4 milliamps. The modules may be connected to a flexible PC board by spring-loaded connectors. In one embodiment a plurality of electrotactile modules may be grouped together to from an electrotactile device. Multiple electrotactile devices may in turn be deployed as part of a wearable article for use in virtual reality, telepresence, telerrobotics or other haptic feedback applications. The system is capable receiving and transmitting tactile data via a communication link, such as a conventional data network. For example, tactile data can be transmitted in a scalable streaming format from a remote site to the system via a data network. The system may form part of a virtual reality entertainment application.

40 Claims, 7 Drawing Sheets

OTHER PUBLICATIONS

R.D. Howe, et al., Remote Palpation Technology, IEEE Eng. in Medicine and Biology, vol. 14, No. 3, pp. 318–323.

Y. Ikei, et al., Texture Presentation by Vibratory Tactile Display, Proc. IEEE VRAIS, IEEE, pp. 199–205 (1997).

K. Sato, et al., Development of Non–constrained Arm with Tactile Feedback Device, Proc. IEEE ICAR, pp. 334–338 (1991).

N. Asamura, et al., A Tactile Feeling Display Based on Selective Stimulation to Skin Receptors, Proc. IEEE VRAIS, pp. 36–41 (1998).

H. Kajimato, et al., Tactile Feeling Display Using Functional Electrical Stimulation, Proc, ICAT, pp. 107–114 (1999).

N. Asamura, et al., A Method of Selective Stimulation to Epidermal Skin Receptors for Realistic Touch Feedback, Proc. IEEE VRAIS, (1999).

"Advanced Neuromodulation Systems Announces First-Quarter Results", Business Wire, Apr. 26, 2001 p0065.

J. G. Linvill, "Development Progress on a Microelectronic Tactile Facsimile Reading Aid for the Blind" Proc. IEEE, pp. 271–274, (1969).

* cited by examiner

MODULAR ELECTROTACTILE SYSTEM AND METHOD

TECHNICAL FIELD

This application relates to an electrotactile system and method for delivering tactile stimuli to a skin surface of a user. The system comprises electrotactile modules each comprising an integrated circuit electrically connectable to an array of electrodes. The modules may be connected together to form an electrotactile device. A plurality of devices may in turn be deployed as part of a wearable article for use in virtual reality, telepresence, telerobotics or other haptic feedback applications. The system is capable of receiving and transmitting data via a communication link.

BACKGROUND

Interactive haptic feedback systems are known in the prior art for delivering tactile data to a user, such as sensations of force and touch. For example, haptic feedback has been used in the past in various aerospace, surgical and defence applications for the purpose of controlling remote robotic vehicles and manipulators. More recently, haptic feedback has been used in telespresence and virtual reality applications. Telepresence refers to the experience or impression of being present at a real-world location remote from one's own immediate environment. Virtual reality is a similar concept except that its goal is to immerse the user in a simulated, computer-generated world, often for the purposes of entertainment. In all of these applications tactile data is conveyed to a user via human interface devices, such as a gloves or exoskeletans. However, these interface devices are typically bulky or awkward to use or are adapted for very specific applications.

Four different types of mechanoreceptors in the human skin detect tactile stimuli, namely the Meissner corpuscle, the Merkel cell, the Pacinian corpuscle and the Ruffini ending. The Meissner corpuscles and Merkel cells detect light touch and are located beneath the surface of the skin approximately 0.7 mm. Both of these mechanoreceptors transduce very slight inputs of mechanical energy into action potentials. Pacinian corpuscles are located deeper in the skin, typically about 2 mm below the skin surface, and are a type of pressure sensor stimulated by strong pressure. Ruffini endings are a type of mechanoreceptor located around the base of hairs and detect hair movements. Most prior art haptic systems developed thus far do not stimulate human skin mechanoreptors selectively or precisely. Such systems are therefore unsuitable for virtual reality and similar applications where fidelity of tactile sensations is critical.

Some prior art telepresence or telerobotic systems rely on applying vibrotactile stimulation to the user. U.S. Pat. No. 5,619,180, Massimino et al., dated Apr. 8, 1997 describes a system for generating a feedback signal corresponding to a force sensed by an effector in a remote environment. The feedback signal is delivered to the local site of the operator where it is transduced into a vibrotactile sensory substitution signal to which the operator is sensitive. Vibrotactile display elements can be located on the operator's limbs, such as the hands, fingers, arms or legs. The operator therefore "feels" the forces that the effector senses to some degree depending upon the fidelity of the force sensing and reproduction system. Previous artificial tactile displays of this sort have been limited primarily to homogenous arrays of relatively small vibrators that provide low-amplitude, high frequency stimulation of the tactile system. Such vibrotactile systems are useful for some applications, but they do not enable a highly sensitive localized response.

U.S. Pat. No. 4,655,673, Hawkes, dated Apr. 7, 1987, describes a telerobotic apparatus comprising a vibration sensitive transducer. The output signal from the transducer is converted to audible sounds which can be intuitively interpreted by the operator as indicators of texture, hardness and the like. Other tactile display developers have proposed acoustic feedback systems using surface acoustic waves to apply shear stresses to a finger surface of a user.

Prior art devices that rely on applying pneumatic stimulation to the user are also known in the prior art. Some prior art systems direct compressed air to a skin surface in the form of air jets, air cuffs or air bellows. For example, Robert Stone conceived a pneumatic bellows glove in 1989, referred to as Teletact, that employed a plurality of air pockets to provide tactile feedback to the fingers and palm of a user.

Electrotactile or electrocutaneous systems are also known for delivering electrical current to electrodes placed on the user's skin to induce a tactile response. U.S. Pat. No. 4,926,879, Sevrain et al., dated May 22, 1990 describes an electro-tactile stimulator comprising a flexible substrate on one surface of which is formed an electrically conductive pattern having a number of electrodes which are placed in contact with a skin surface of a user. The primary purpose of such electrotactile devices is to assist hearing or vision impaired persons in interpreting environmental stimuli. The specific object of the Sevrain et al. invention is to achieve this result while avoiding skin irritation caused by electrically induced changes in the pH of skin tissue.

U.S. Pat. No. 4,390,756, Hoffmann et al., dated Jun. 28, 1983, relates to an electrocutaneous stimulation apparatus which may be used as a hearing prosthesis by deaf individuals. According to this invention acoustical signals, in particular speech sounds, are encoded into electrocutaneous stimulation patterns. The tactile stimulations are applied via skin surface electrodes, for example on the user's forearm, and can be interpreted as speech information.

U.S. Pat. No. 5,957,812, Harrigan, dated Sep. 28, 1999, relates to an electrical muscle stimulation (EMS) device configured as a vending machine that allows a user to control the amount of electronic impulses required to stimulate the user's muscles to contract and exercise. Other similar electrocutaneous devices for electrically stimulating injured tissue are well-known in the medical and rehabilitation fields. For example, totally implanted pulse generator (IPG) and radio frequency (RF) electrocutaneous systems having been used as spinal cord stimulators and pain relief devices. Subdermal electrocutaneous stimulation has also been used to provide sensory feedback to users of upper extremity neuroprostheses.

Conventional EMS devices, electric massagers and electrocutaneous devices used for tissue rehabilitation purposes and the like employ comparatively few electrodes each applying a relatively large amount of current (e.g. greater than 15 milliamps). The result is the provision of blunt sensations to the user. Most devices are not designed to selectively stimulate all four types of mechanoreceptors in the human skin described above. Moreover, the current applied is pre-programmed and there is no provision for adjustment of the current parameters based on user interactivity or other variable data input.

Although there is a growing awareness of the advantages of electro-neuromodulation therapy for medical or rehabilitative purposes, thus far electrotactile or electrocutaneous devices have not been effectively applied in the information and entertainment industries, such as part of a virtual reality computer application. The need has therefore arisen for an improved electrotactile system useful for virtual reality simulations and the like which overcomes the various limitations of the prior art. Unlike conventional devices, applicant's invention is capable of inducing very sensitive tactile sensations in a user, has network data transfer capability and relatively low current and power requirements, and is operable bidirectionally as both a tactile sensation input and feedback device. Other features and advantages of the invention are described below.

SUMMARY OF THE INVENTION

In accordance with the invention, an electrotactile module for delivering tactile stimuli to a skin surface of a user is provided. The module comprises a housing having a first surface and a second surface, an array of electrodes arranged on the first surface for contacting the user's skin, and an integrated circuit electrically connected to the electrodes for independently providing electrical current to each of the electrodes in a predetermined control sequence.

Preferably the first surface contacting the user's skin is outwardly curved. A PC board, which is preferably flexible, is connected to the second surface. The device may further include at least one connector for connecting the module to the PC board. In one embodiment of the invention, the connector is spring-loaded. Multiple spring-loaded connectors for connecting the module to the PC board may also be provided.

The integrated circuit has data processing and current driving capability and is preferably located within the housing. The current delivered from the integrated circuit to each of the electrodes is preferably small, for example less than 4 milliamps. The predetermined control sequence may be received by the integrated circuit from a remote source, such as via a conventional data network.

A group of electrotactile modules may be operatively coupled together to form an electrotactile device. The device may include the PC board as well as power and data connectors. Multiple electrotactile devices may in turn be deployed in a wearable article to maintain the electrotactile devices in contact with the user's skin. For example, the wearable article may comprise a plurality of pockets for receiving the electrotactile devices. The wearable article may be constructed from flexible fabric capable of conforming to the contours of the user's body. In one embodiment the wearable article may be adjustable to adjustably position the electrotactile devices in contact with the user's skin. An electronic control device may also be provided for receiving and processing encoded tactile data transmitted from a remote site via a data network. The electronic control device preferably has the same shape and size as the electrotactile devices so that it may also removably fit into a pocket of the wearable article.

A method of delivering an electrical signal to a user wearing an electrotactile device as described above is also disclosed. The method includes the steps of transmitting input signals to the electrotactile device representative of predetermined desired tactile sensations; processing the input signals in the electrotactile device to produce output signals comprising tactile sensation and location data; and delivering current to selected electrodes of the electrode array in a sequence corresponding to the output signals.

The input signals may be generated, for example, by manipulation of a hand-held input device by the user while immersed in a virtual reality application. The input signals may also be generated by movement of the electrotactile device relative to a skin surface of the user. In some applications the input signals are transmitted to the electrotactile device from a remote site, for example in a scalable streaming data format suitable for real-time network transmission.

The method may further include the step of mapping tactile sensation and location data to user parameters stored in memory to adapt the output signals to the particular skin properties of the user.

An electrotactile system for delivering tactile information to a skin surface of a user is also disclosed. The system includes at least one electrotactile module as described above comprising an array of electrodes for contacting the user's skin surface and an integrated circuit electrically connected to the electrodes; a receiver connectable to a data network for receiving input signals comprising encoded tactile data; and a signal processor for decoding the encoded tactile data to produce output signals suitable for transfer to the integrated circuit, the output signals comprising tactile sensation and location data. According to the system, the integrated circuit provides current to the electrodes in accordance with the output signals received from the signal processor.

As indicated above, the tactile data may be encoded at a site remote from the electrotactile device, such as by a virtual reality simulator. The signal processor may further include a mapping algorithm for adjusting the tactile sensation and location data to the specific skin parameters of the user stored in memory.

A tactile feedback subsystem may also optionally be provided for measuring changes in the conductivity of the electrodes caused by changes in the position of the electrodes relative to the skin surface of the user over time.

BRIEF DESCRIPTION OF DRAWINGS

In drawings which illustrate embodiments of the invention but which should not be construed as restricting the spirit or scope of the invention in any way.

DETAILED DESCRIPTION

This application relates a modular electrotactile system and method. As used in this patent application the term "electrotactile" refers to the use of electrical stimuli to induce a tactile sensation in a user, such as a sensation of touch or pressure. The terms "electrotactile device" or "electrocutaneous device" both refer to an apparatus that activates nerve axons in the skin by applying electric current directly to the skin surface.

FIGS. 1(a)–1(j) illustrate an electrotactile module 10 developed by the applicant for delivering tactile stimuli to a user. A plurality of modules 10 may be assembled together to form an integrated electrotactile device 12 as shown in FIGS. 3(a)–3(e). Further, a plurality of devices 12 may be deployed in a wearable article 14 for placement in contact with a skin surface of a user as illustrated in FIGS. 4(a)–4(d).

As shown best in FIGS. 1(a)–1(j), each electrotactile module 10 comprises a thin housing 16 having a first surface 18 and a second surface 20. An integrated circuit 22 is mounted on or within each housing 16 (FIGS. 1(i)–1(j)). An array of electrodes 24 are arranged on first surface 18 and extend outwardly therefrom a short distance for contacting the user's skin (FIG. 2(a)). As explained further below, each of the electrodes 24 is electrically connected to integrated circuit 22 such that electrical current may be independently provided to electrodes 24 in a pre-determined control sequence to induce tactile sensation.

Figure 2A:
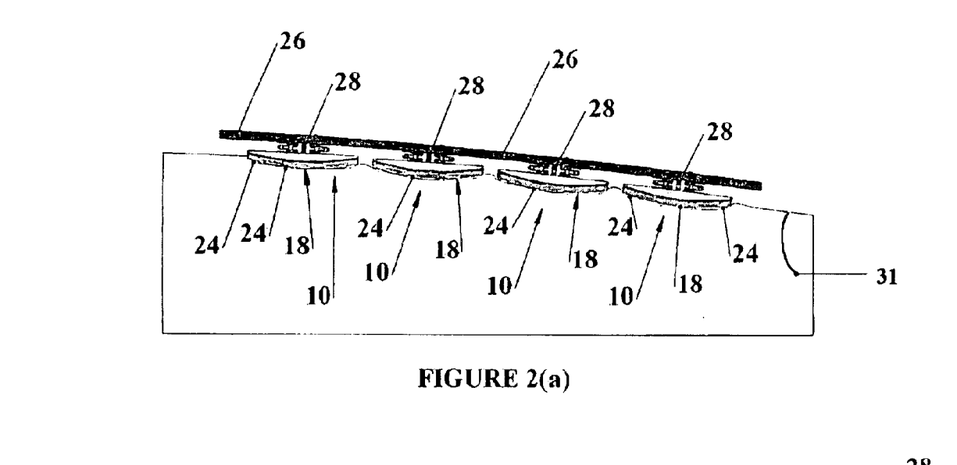
FIG. 2(a) is side view of a plurality of electrotactile modules in contact with a skin surface of a user, each of the modules being attached to a common PC board.
Figure 2B:
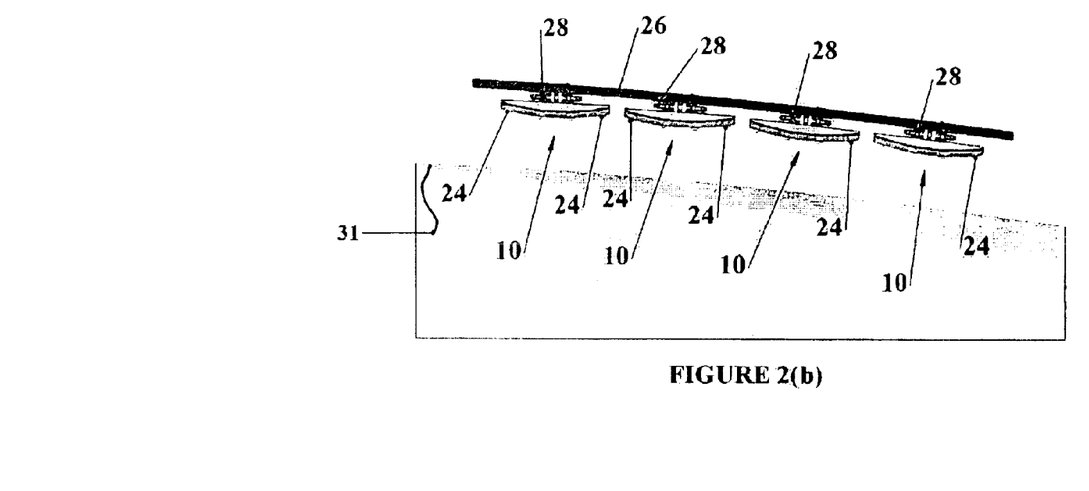
FIG. 2(b) is a side view of the electrotactile modules of FIG. 2(a) spaced apart from the user's skin surface.

Housing first surface 18 carrying electrodes 24 is preferably curved outwardly to conform to the natural contour a surface 31 of the user's skin as shown best in FIG. 2(a). This arrangement enhances user comfort and reduces shear forces along the edges of module 10 contacting the skin. However, as will be apparent to a person skilled in the art, the curvature of surface 18 is not a critical feature of the invention and other geometric shapes could be substituted in alternative embodiments of the invention.

Figure 1:
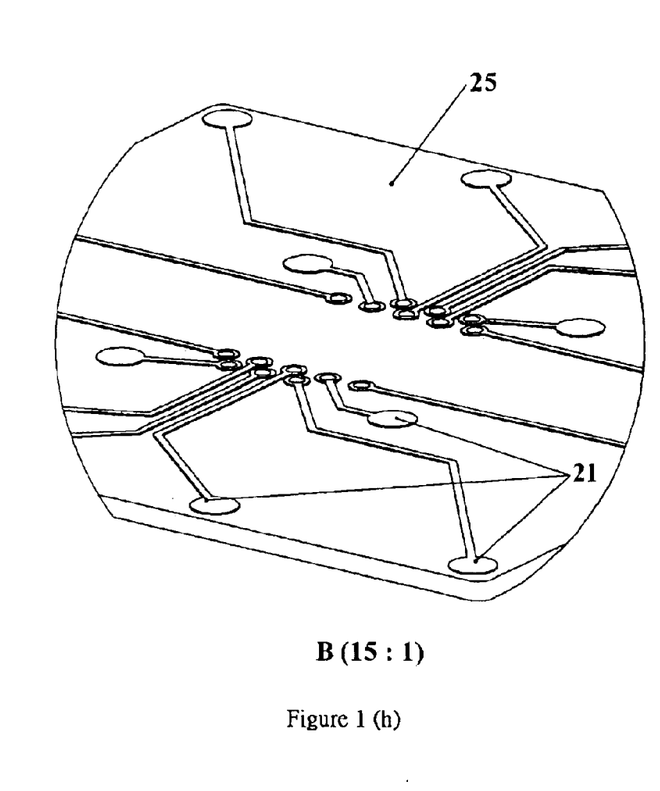
FIG. 1(a) is a perspective view of a convex first surface of an electrotactile module comprising an array of electrodes for contacting the skin surface of a user.
FIG. 1(b) is a perspective view of a second surface of the electrotactile module of FIG. 1(a) for connecting the electrotactile module to a PC board.
FIG. 1(c) is a plan view of the module first surface of FIG. 1(a).
FIG. 1(d) is a plan view of the module second surface of FIG. 1(b).
FIG. 1(e) is a side elevational view of the electrotactile module.
FIG. 1(f) is an end elevational view of the electrotactile module.
FIG. 1(g) is an exploded upper perspective view of an electrotactile module.
FIG. 1(h) is an enlarged view of a portion of the module of FIG. 1(g).
FIG. 1(i) is an exploded lower perspective view of an electrotactile module.
FIG. 1(j) is an enlarged view of a central portion of the module of FIG. 1(i).
Figure 1A:
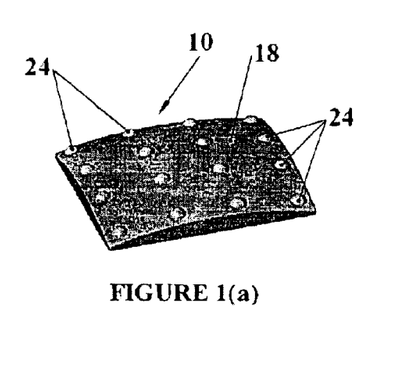
Figure 1B:
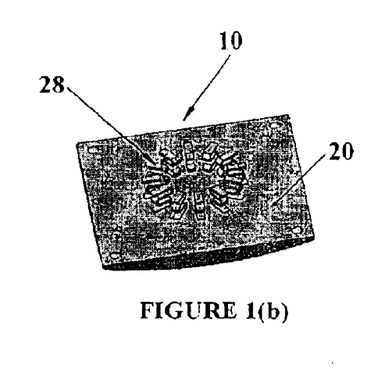
Figure 1C:
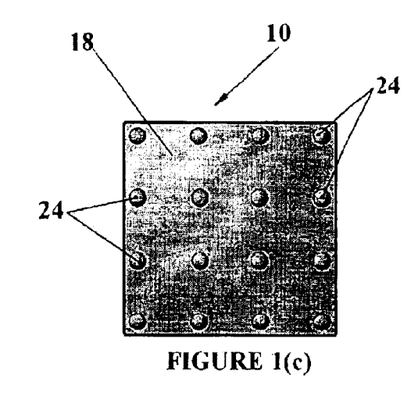
Figure 1D:
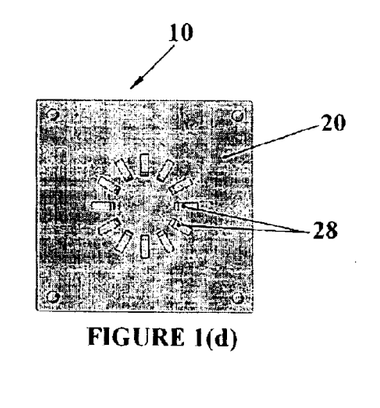
Figure 1E:
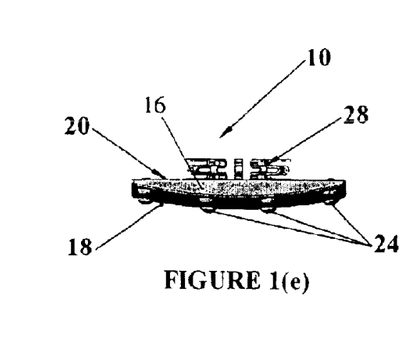
Figure 1F:
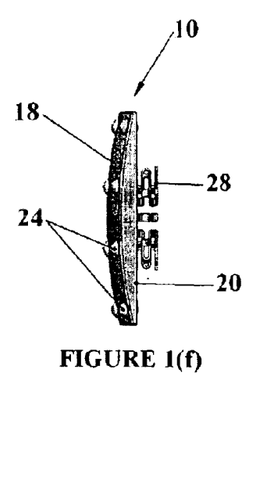

As shown best in FIGS. 1(b), 1(i) and 2(a), each electrotactile module 10 is connected to a PC board 26 by one or more connectors 28 extending from housing second surface 20. Preferably a plurality of connectors 28, arranged for example in a circular array, connect module 10 and PC board 26 together. In one embodiment of the invention connectors 28 are spring-loaded to gently bias electrodes 24 in contact with surface 31 of the user's skin. Further, PC board 26 may be flexible to enable module 10 to better conform to the user's skin and enhance the comfort of wearable article 14.

Integrated circuit 22 functions as a microprocessor for controlling the delivery of current to electrodes 24. In the embodiment illustrated in FIGS. 1(i) and 1(j), circuit 22 is deployed on a PC board 25. Wire conductors 23 are provided for connecting circuit 22 to contact pads 21. Each contact pad 21 contacts a corresponding electrode 24 when module 10 is assembled. As shown in FIGS. 1(i) and 1(j), wire conductors 23 also electrically connect circuit 22 to contact pads 27. Each contact pad 27 contacts a corresponding connector 28 when module 10 is assembled. As will be apparent to a person skilled in the art, other similar microelectronic circuits could be substituted for circuit 22. For example, circuit 22 could be deployed on a conventional silicon chip. As used in this patent application "integrated circuit" refers to any microelectronic component having data processing and current driving capability.

As shown in FIG. 2(a), a plurality of electrotactile modules 10 may be connected to a single PC board 26 in one embodiment of the invention. For example, a single flexible PC board 26 may be used to route data to all of the modules 10 comprising an electrotactile device 12.

The structure of an electrotactile device 12 is illustrated in detail in FIGS. 3(a)–3(e). Device 12 includes a PC board 26 and a plurality of modules 10 as explained above. Device 12 further includes data connectors 29 and a data transmitting/receiving unit 30 mounted on PC board 26. As described below, external control data is received by device 12 and transmitted through data transmitting/receiving unit 30 to integrated circuits 22 of individual modules 10. Sensory and position feedback data may also be transmitted from modules 10 through transmitting/receiving unit 30 to an external processor in a similar manner.

Figure 3A:
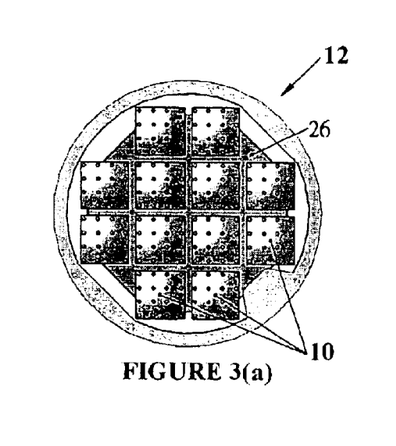
FIG. 3(a) is a plan view of a first surface of an electrotactile device comprising a plurality of electrotactile modules of FIG. 1.
Figure 3B:
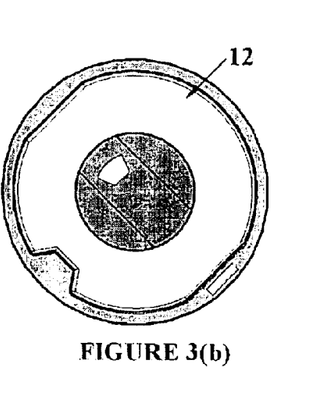
FIG. 3(b) is a plan view of a second surface of the electrotactile device of FIG. 2(a).
Figure 3C:
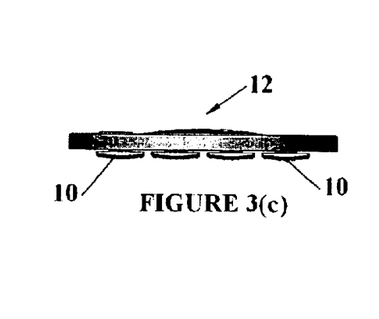
FIG. 3(c) is a side elevational view of an electrotactile device in a horizontal orientation.
Figure 3D:
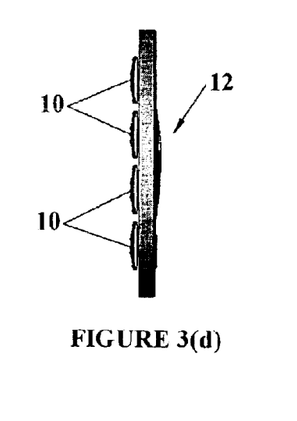
FIG. 3(d) is a side elevational view of an electrotactile device in a vertical orientation.
Figure 3E:
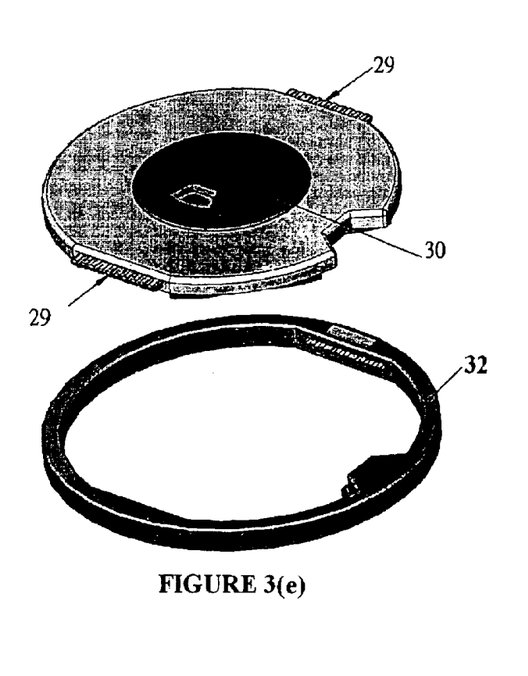
FIG. 3(e) is an exploded perspective view of an electrotactile device and socket assembly.
Figure 4A:
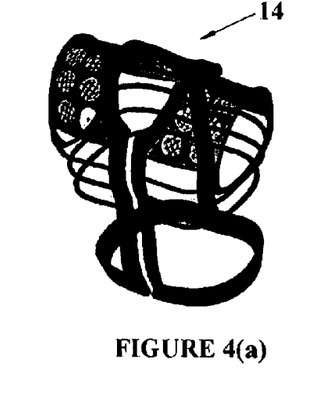
FIG. 4(a) is a rear perspective view of a wearable article comprising pockets for receiving a plurality of electrotactile devices.
Figure 4B:
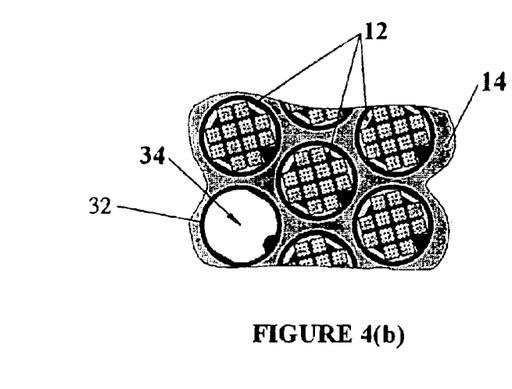
FIG. 4(b) is an enlarged plan view of a portion of the wearable article showing the inner surface of several electrotactile devices.
Figure 4C:
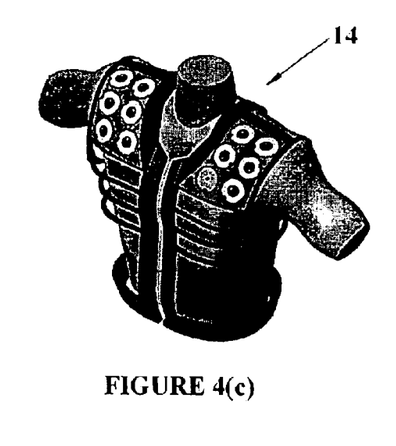
FIG. 4(c) is a front perspective view of the wearable article suitable for wear on the upper torso of a user.
Figure 4D:
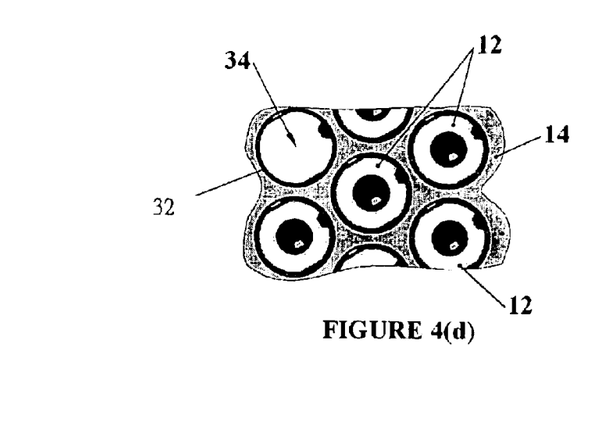
FIG. 4(d) is an enlarged plan view of a portion of the wearable article showing the outer surface of several electrotactile devices.

Device 12 fits within a socket 32. In the illustrated embodiment socket 32 is annular in shape for receiving a device 12 formed in a circular shape. However, as will be appreciated by a person skilled in the art, other geometric shapes could be selected.

Wearable article 14 is preferably constructed from a flexible fabric material to conform to the contour of the user's body (FIGS. 4(a)–4(d)). In the illustrated embodiment a vest is shown. Wearable article 14 includes a plurality of pockets or sleeves 34 each sized to receive a socket 32 and an accompanying electrotactile device 12. Each device 12 is inserted into its corresponding sleeve 34 in an orientation wherein modules 10 extend inwardly in contact or potential contact with the user's skin (FIG. 4(a)). In this deployed orientation data connectors 29 are accessible for connecting device 12 to an external data source, such as by a network communication link.

In one embodiment of the invention wearable article 14 may be adjustable to adjustably position electrotactile devices 12 in contact with a skin surface of a user. For example, article 14 may be inflatable to provide a comfortable contact fit between devices 12 and the user's skin surface.

Figure 5:
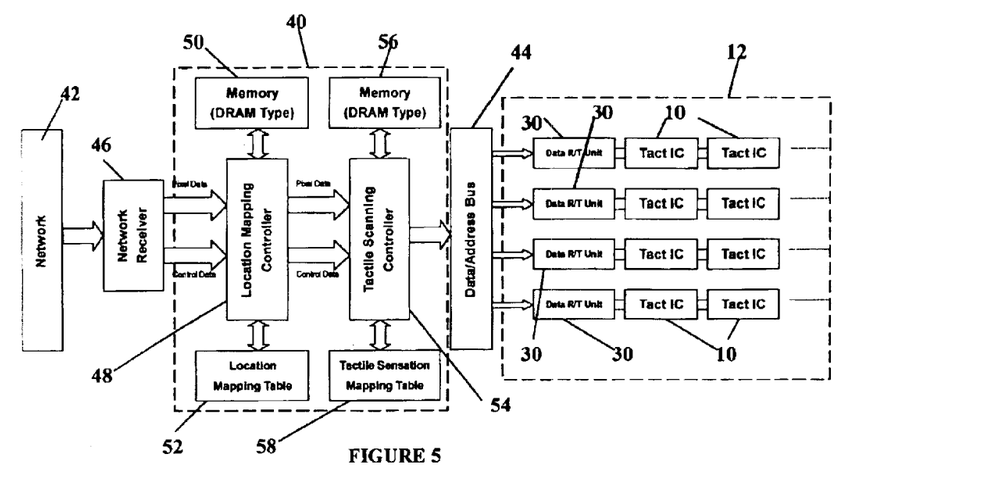
FIG. 5 is a schematic view of an electronic control device according to one embodiment of the invention for receiving and processing tactile and control data transmitted to an electrotactile device from a remote site via a data network.

In order to facilitate reception and transmittal of control and feedback data, an electronic control device 40 is also provided as shown schematically in FIG. 5. In one embodiment of the invention control device 40 has a size and geometric shape similar to an electrotactile device 12. Control device 40 can therefore fit removably into a sleeve 34 of wearable article 14 in the same manner as an electrotactile device 12. As discussed further below, control device 40 includes controllers for receiving data in a streaming format and delivering it to the appropriate electrotactile device 12.

The network data transfer interface of applicant's invention is shown in FIG. 5. Data is transmitted between a data network 42 and individual electrotactile modules 10 via electronic control device 40 and data/address bus 44. The means for transmission can be wired or wireless. Each electrotactile device 12 is essentially a network peripheral capable of receiving and transmitting data, for example, in a scalable streaming format.

As shown in FIG. 5, device 40 includes a network receiver 46 for receiving tactile data and control data from network 42. Tactile data describes the tactile texture of an object which virtually contacts the skin of the user. Control data describes the sequence of operation of individual electrotactile modules 10 and electrodes 24 thereof, including the maximum current of each electrode 24 and other control parameters. The tactile data may be transmitted in a "frame by frame" or "packet" data structure similar to video data.

Tactile data and control data is passed from network receiver 46 to a location mapping controller 48. Controller 48 accesses a DRAM type memory 50 to support its data processing operations and an EEPROM memory 52 which stores a location mapping table. The purpose of the location mapping is to filter incoming data and to process "tactile pixels" corresponding to discrete tactile locations. For example, in one embodiment of the invention only tactile pixels which have changed after the prior frame will be filtered to pass to the next step in the data processing process and excessive incoming data will be filtered out.

The processed tactile data and control data are passed from the location mapping controller 48 to a tactile scanning controller 54 which generates tactile sensation data. Similar to controller 48, controller 54 accesses a DRAM type memory 56 to support its data processing operations and an EEPROM memory 58 which stores a tactile sensation mapping table. Tactile data may be provided according to different data protocols depending upon the data source. Tactile scanning controller 54 maps the input protocol to a data format compatible with the data receiving/transmitting 30 of each electrotactile device 12.

Since skin properties vary for different parts of the body and also vary from one person to another, it is necessary to incorporate an "adjusting algorithm" in tactile scanning controller 54. A distribution matrix may be used for distributing tactile current data over a region of neighbouring electrodes 24. For example, different skin mechanoreceptors require a different distribution of tactile current to trigger tactile sensation.

As indicated above, control electronic device 40 may be capable of receiving data in a scalable streaming format. In this case the decoding algorithms implemented by controllers 48, 54 preferably ensure that data is delivered to electrotactile devices 12 at a constant rate and any gaps in the data stream are effectively bridged. Thus electronic device 40 is preferably programmed to compensate for transmission latency and delays inherent in the communications link. As will be apparent to a person skilled in the art, the specific nature and bandwith of the communication link or other means for transmitting data to devices 12 from a remote site is not a critical feature of the present invention. As mentioned above, the means for transmission can be wired or wireless.

By way of example, specially adapted tactile hardware may be used to collect or generate time-variant tactile data at a remote site (in a manner similar to time-variant video data). The tactile data is encoded by streaming format encoding hardware. The encoded data is transmitted in a scalable streaming format via a conventional data network. The encoded data is then decoded and converted by an inverse tactile processor, such as by electronic control device 40.

Processed data from electronic control device 40 is delivered to an electrotactile device 12 via data/address bus 44. Since bus 44 is a common pathway, all the data/address information transmitted by any of the electrotactile devices 12 or control device 40 can be potentially received by any of the other devices 12 connected to bus 44. However, only the device 12 (and modules 10) with the designated address will accept and be able to process the information to generate tactile sensation.

Data from electronic control device 40 is received by each individual electrotactile device 12 by data receiving/transmitting 30. Unit 30 distributes the data to integrated circuits 22 of the various electrotactile modules 10 which comprise each device 12. Each integrated circuit 22 receives the processed data and transforms it into small currents, preferably less than 4 milliamps, which are applied to electrodes 24. Accordingly, each module 10 has both data processing and current driving capability. Further, the current can be applied to each electrode 24 independently to provide very precise sensory control and to enable the delivery of multi-channel stimuli. Since the current delivered to each individual electrode 24 is small (i.e. typically less than 4 milliamps) each device 12 is relatively energy efficient. Accordingly, devices 12 are well-suited for use in association with portable electronic equipment having power management constraints, such as personal digital assistants or mobile phones. Also, since the current delivered to each individual electrode 24 is small, each device 12 is relatively safe to use and is unlikely require rigorous regulatory pre-approval as do conventional electrocutaneous medical devices.

In order to provide detailed sensory information, a dense array of electrodes 24 are desirable (on the order of $10^4$). However, the total number of electrotactile devices (and electrodes 24) may vary depending upon the application. For each electrode 24, the stimuli from threshold to about 50 dB can be delivered throughout the frequency range from near DC to about above 200 dHz.

By way of example, an electrode array on each module 10, or group of modules 10, may consist of between approximately 8×8 electrodes 24 (i.e. 64 electrodes in total) to 24×24 electrodes 24 (i.e. 576 electrodes in total). Each electrotactile device 12 (comprising multiple modules 10) may have on the order of 1,000 electrodes 24 in total, although the number of electrodes 24 may vary without departing from the invention as indicated above. The pitch (i.e. the distance between respective electrodes 24) may be on the order of 2 mm. The maximum operating current through each electrode 24 may be on the order of 0.8 milliamps (mA). Thus the present invention features a relatively large number of electrodes 24 each delivering a relatively small current in comparison to prior art electrocutaneous devices. As will be appreciated by a person skilled in the art, the amount of current required to be delivered to each electrode 24 to generate the desired tactile sensation is dependent on the pitch and density of the electrode array as well as the contact area of the electrode 24 on the skin.

Figure 6A:
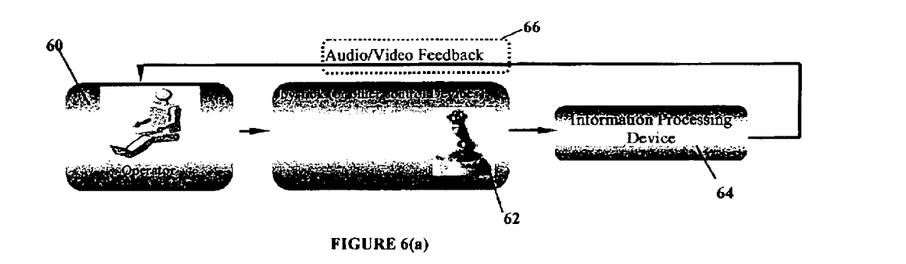
FIG. 6(a) is a schematic view of a traditional virtual reality system.

Electrotactile devices 12 may be used as part of both a network-enabled sensory input and sensory feedback system for interactive virtual reality applications and the like. FIG. 6(a) illustrates schematically a traditional virtual reality system wherein an operator 60 manually manipulates a control device 62 such as a joystick or computer mouse. Data processing unit 64 interprets the user inputs and generates control commands for controlling user sensory feedback devices, such as audio or video devices 66.

Figure 6B:
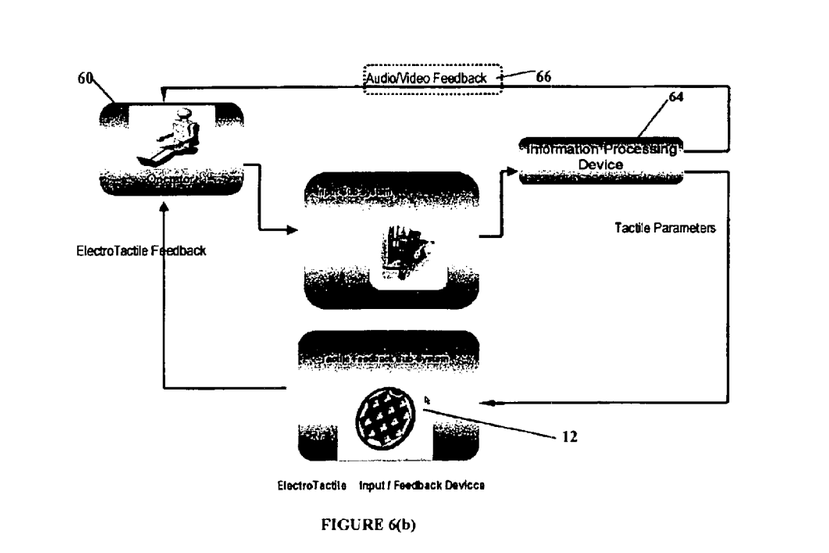
FIG. 6(b) is a schematic view of a virtual reality system modified to include tactile input and feedback subsystems in accordance with the invention.

FIG. 6(b) illustrates a virtual reality system modified to include a tactile input and feedback subsystems in accordance with the invention. In this case user inputs received by data processing unit 64 are interpreted to generate tactile parameters in the form of tactile data and control data in addition to audio or video control signals. As discussed above, the tactile and control data is transmitted to one or more electrotactile devices 12, such as via a data network 42 (FIG. 5), where it is processed and transformed into small currents applied to the user's skin to stimulate skin mechanoreceptors and the like. Wearable article 14 is an example of an application employing such an input subsystem where there is no relative movement between electrotactile device(s) 12 and the user's skin.

If there is relative movement between electrotactile device(s) 12 and the user's skin, then devices 12 may be employed as data feedback devices in addition to input devices. In particular, when the user's skin comes in contact with a device 12, the contacted electrodes 24 form part of an electrically conductive loop while the non-contacted electrodes 34 behave like open-loop electrodes. A time-variant "current map" of the open-loop electrodes 24, which corresponds to the input movements of the user, can be captured by a tactile feedback or subsystem. For example, providing that the current map's relation with time is known, the system can be used to determine the movement of the skin (for instance, the hands) relative to the electrotactile devices 12. The captured input information may then be fed back to data processing unit 64 (FIG. 6(b)) to generate modified tactile parameters as discussed above. Thus in this embodiment electrotactile devices 12 are bi-directional, that is they may function as both input and "man-in-the-loop" feedback devices.

In operation, a plurality of electrotactile modules 10 may be assembled together as described above to form an integrated electrotactile device 12. Depending upon the application, a plurality of electrotactile devices 12 may in turn be electrically coupled together and placed in contact with a skin surface of the user, such as by means of a wearable article 14. Each electrotactile device 12 is capable of receiving data from an electronic control device 40 removably positioned on or within wearable article 14. To this end, each device 12 includes data and power connectors 29 as described above to enable passage of data and electrical power to respective modules 10.

In one embodiment of invention wearable article 14 (including electrotactile devices 12) may function as a network peripheral. As described above, tactile and control data generated at a remote site may be delivered to wearable article 14 via a network communication link, such as in a scalable streaming data format. The data may, for example, correspond to user input generated in a virtual reality application or to real world haptic data generated by telepresence or telerobotic applications.

The input data is received and decoded by electronic control device 40 as described above. The decoded, processed data is then delivered via data/address bus 44 to the data transmitting/receiving unit 30 of each individual device 12 which in turn distributes the data to the integrated circuit 22 of each individual electrotactile module 10. Each integrated circuit 22 receives the decoded data and transforms it into small currents which are applied to electrodes 24 in the desired pattern and sequence to stimulate tactile sensations.

In one application of the invention electrotactile devices 12 may also form part of a system for encoding feedback data and transmitting such data to a data processor as part of an interactive application. As described above, if electrotactile devices 12 are capable of moving relative to the user's skin, the conductivity of individual electrodes 24 may be mapped during a data acquisition time period to generate an electrical representation of the movements of a user. This time-variant map may in turn be fed back to a processor to generate tactile data based on the user feedback. Depending upon the application, the haptic feedback could be continuous or restricted to discrete time periods.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An electrotactile module for delivering tactile stimuli to a skin surface of a user comprising:
    a housing having a first surface and a second surface;
    an array of electrodes arranged on said first surface for contacting said skin surface;
    a PC board:
    at least one spring-loaded connector connecting said second surface and electrically coupling said electrodes to said PC board; and
    an integrated circuit electrically connected to said electrodes for independently providing electrical current to each of said electrodes in a predetermined control sequence.

2. The module as defined in claim 1, wherein said first surface is outwardly curved.

3. The module as defined in claim 1, wherein said PC board is flexible.

4. The module as defined in claim 1, further comprising a plurality of connectors, each one of said electrodes having one of said connectors corresponded to connect with said PC board, wherein each of said connectors is spring-loaded.

5. The module as defined in claim 1, wherein said module is connectable to a data network for receiving said predetermined control sequence.

6. The module as defined in claim 1, wherein said integrated circuit is a microprocessor for processing input signals received from a remote data source.

7. The module as defined in claim 1, wherein said module comprises between 64 and 576 electrodes.

8. The module as defined in claim 1, wherein the current delivered to each of said electrodes is less than 4 milliamps.

9. The module as defined in claim 1, wherein said integrated circuit is located within said housing.

10. An electrotactile system for delivering tactile information to a skin surface of a user comprising:
at least one electrotactile module of claim 1,
a receiver connected to a data network for receiving input signals comprising encoded tactile data;
a signal processor for decoding said encoded tactile data to produce output signals suitable for transfer to said integrated circuit, said output signals comprising tactile sensation and location data;
wherein said integrated circuit provides current to said electrodes in accordance with said output signals received from said signal processor.

11. The system as defined in claim 10, wherein said encoded tactile data is encoded at a site remote from said system by a virtual reality simulator.

12. The system as defined in claim 10, wherein said system comprises a plurality of modules operatively connected together to form an electrotactile device.

13. The system as defined in claim 12, further comprising a wearable article for maintaining said electrotactile device in contact with said skin surface of said user.

14. The system as defined in claim 12, wherein all of said electrotactile modules of said electrotactile device are connected to a flexible PC board.

15. The system as defined in claim 10, wherein said receiver and said signal processor form part of an electronic control module separate from said electrotactile module.

16. The system as defined in claim 15, wherein said electronic control module and said electrotactile module are substantially the same shape and size.

17. The system as defined in claim 15, further comprising a data/address bus for exchanging data between said electrotactile module and said electronic control module.

18. The system as defined in claim 10, wherein said signal processor further comprises a mapping algorithm for adjusting said tactile sensation and location data to adapt to skin parameters of said user stored in memory.

19. The system as defined in claim 10, wherein said system further comprises a tactile feedback subsystem comprising means for measuring changes in the conductivity of said electrodes caused by changes in the position of said electrodes relative to said skin surface of said user during a discrete time period.

20. The system as defined in claim 10, wherein the current delivered to each of said electrodes is less than 15 milliamps.

21. The system as defined in claim 10, wherein said signal processor comprises a location mapping controller and tactile scanning controller for continuously processing said tactile data received in a streaming data format.

22. An electrotactile device for delivering tactile stimuli to a skin surface of a user, said electrotactile device comprising:
a plurality of electrotactile modules operatively coupled together, each one of said electrotactile modules including a housing having a first surface and a second surface, said first surface having an array of electrodes arranged thereon for contacting the skin surface;
an integrated circuit electrically connected to said electrodes for independently providing electrical current to each of said electrodes in a predetermined control sequence;
a PC board; and
each of said plurality of modules electrically and mechanically connecting said PC board by at least one spring-loaded connector.

23. The device as defined in claim 22, further comprising a power connector for connecting said device to an external power source.

24. The device as defined in claim 22, further comprising a data connector for connecting said device to a data input.

25. The device as defined in claim 22, wherein said device is connectable to a data network.

26. The device as defined in claim 22, further comprising an electronic control module having substantially the same shape and size as one of said electrotactile modules, wherein said control module is detachable from said device.

27. The device as defined in claim 22, further comprising a data receiving/transmitting unit for exchanging data between each of said modules and an external data processor.

28. The device as defined in claim 27, wherein said device and said data processor are connected via a data network.

29. The device as defined in claim 22, further comprising a socket sized to extend around the periphery of said device for removably receiving and supporting said PC board.

30. A method of delivering an electrical signal to a user wearing an electrotactile device of claim 13, said method comprising:
transmitting input signals to said electrotactile device representative of predetermined desired tactile sensations;
processing said input signals in said electrotactile device to produce output signals comprising tactile sensation and location data;
delivering current to selected electrodes of said electrode array in a sequence corresponding to said output signals; and
transmitting current data representative of tactile parameters of said user from said electrotactile device to a remote site.

31. The method as defined in claim 30, wherein said input signals are generated by manipulation of a hand-held input device by said user.

32. The method as defined in claim 30, wherein said input signals are generated by said electrotactile device in response to movements by said user.

33. The method as defined in claim 30, wherein said input signals are generated by a virtual reality simulator.

34. The method as defined in claim 30, wherein said input signals are transmitted to said electrotactile device from a remote site via a data network.

35. The method as defined in claim 34, wherein said network is wireless.

36. The method as defined in claim 34, wherein said input signals are transmitted in a scalable streaming data format suitable for real-time network transmission.

37. The method as defined in claim 30, further comprising the step of mapping said tactile sensation and location data in said electrotactile device to user parameters stored in memory to adapt said output signals to the particular skin properties of said user.

38. The method as defined in claim 30, wherein said input signals comprise encoded data representative of said predetermined desired tactile sensations and wherein said electrotactile device comprises a decoding algorithm stored in memory for decoding said encoded data.

39. The method as defined in claim 30, wherein said current data varies in accordance with changes in the position of said users skin relative to said electrotactile device.

40. The method as defined in claim 30, wherein the current delivered to any one of said electrodes is less than 15 milliamps.

* * * * *